(12) United States Patent
Rupe et al.

(10) Patent No.: US 11,646,948 B2
(45) Date of Patent: *May 9, 2023

(54) PROACTIVE OPERATIONS PLATFORM

(71) Applicant: CABLE TELEVISION LABORATORIES, INC., Louisville, CO (US)

(72) Inventors: Jason W. Rupe, Lafayette, CO (US); John Phillips, Fort Collins, CO (US); Jingjie Zhu, Erie, CO (US); Chad Riland, Fort Collins, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,992

(22) Filed: Nov. 29, 2021

(65) Prior Publication Data

US 2022/0086056 A1    Mar. 17, 2022

Related U.S. Application Data

(63) Continuation of application No. 16/512,470, filed on Jul. 16, 2019, now Pat. No. 11,190,410.

(60) Provisional application No. 62/698,382, filed on Jul. 16, 2018, provisional application No. 62/744,252, filed on Oct. 11, 2018, provisional application No. 62/859,538, filed on Jun. 10, 2019.

(51) Int. Cl.
| | |
|---|---|
| *H04L 41/147* | (2022.01) |
| *H04L 41/12* | (2022.01) |
| *H04L 43/0817* | (2022.01) |
| *H04L 41/0695* | (2022.01) |
| *H04L 41/0681* | (2022.01) |
| *G06Q 10/06* | (2012.01) |
| *G06F 16/36* | (2019.01) |
| *H04L 43/04* | (2022.01) |
| *G06Q 10/0635* | (2023.01) |

(52) U.S. Cl.
CPC .......... *H04L 41/147* (2013.01); *G06F 16/367* (2019.01); *G06Q 10/0635* (2013.01); *H04L 41/0681* (2013.01); *H04L 41/0695* (2013.01); *H04L 41/12* (2013.01); *H04L 43/04* (2013.01); *H04L 43/0817* (2013.01)

(58) Field of Classification Search
CPC ............... H04L 41/147; H04L 41/0681; H04L 41/0695; H04L 41/12; H04L 43/04; H04L 43/0817; H04L 41/5025; G06F 16/367; G06Q 10/0635
See application file for complete search history.

(56) References Cited

PUBLICATIONS

CableLabs® Proactive Network Maintenance, "Combined Common Collection Framework Architecture Technical Report", CL-TR-XCCF-PNM-V01-180814, Cable Television Laboratories, Inc. 2018, 46 pages. (Year: 2018).*

* cited by examiner

*Primary Examiner* — Austin J Moreau
*Assistant Examiner* — Chhian (Amy) Ling
(74) *Attorney, Agent, or Firm* — Elevated IP, LLC

(57) ABSTRACT

A proactive operations (ProOps) platform is contemplated to facilitate processing data for purposes of turning included information into action, such as to enable operators to proactively manage network operations using information derived from mathematical analysis of raw data collected from network devices.

20 Claims, 3 Drawing Sheets

PROACTIVE OPERATIONS PLATFORM

CROSS-REFERENCE TO RELATED APPLICATIONS

This application is a continuation of U.S. patent application Ser. No. 16/512,470 (now U.S. Pat. No. 11,190,410) filed Jul. 16, 2019, which application claims the benefit of U.S. provisional application No. 62/698,382 filed Jul. 16, 2018, U.S. provisional application no. 62/744,252 filed Oct. 11, 2018 and U.S. provisional application No. 62/859,538 filed Jun. 10, 2019, the disclosures of which are hereby incorporated in their entireties by reference herein.

TECHNICAL FIELD

The present invention relates to a proactive operations (ProOps) platform, such as but not necessarily limited to a ProOps platform sufficient for processing network data so as to implement actions, applications, or other activities.

BACKGROUND

Proactive network maintenance (PNM) relates to a philosophy of supporting networks, systems, or other environments where devices rely on some level of coordinated communication to facilitate activities. One goal of PNM contemplates detecting impending failure conditions and corresponding remediations before leading to problems or disruptions noticeable to users, subscribers, clients, etc. The detection of impending failure conditions or other undesirable situations may be determined by mathematically analyzing data associated with the devices, network elements, nodes, interfaces or other entities involved in facilitating the networking. The collection of such data may be undertaken using various mechanisms and processes depending on the networking environment and the capabilities of the associated devices. While PNM may be implemented in virtually any type of network, Combined Common Collection Framework Architecture Technical Report, CL-TR-XCCF-PNM-V01-180814, released by Cable Television Laboratories, Inc. in 2018, the disclosure of which is hereby incorporated by reference in its entirety herein, considers a combined common collection framework (XCCF) for providing a structured approach to collecting data of the type useful with PNM.

XCCF may be considered as a set of Python modules that work in concert to set up a network, such as a cable plant or a non-cable network/system, for polling using methods like but not limited to Simple Network Management Protocol (SNMP), managing requests for PNM data and storing Trivial File Transfer Protocol (TFTP) output in native form or SNMP results in JavaScript Object Notation (JSON) files. Applications can request data from the XCCF based on time parameters, data types, etc. in a flexible architecture supporting many possible PNM approaches and other use cases. The PNM applications relying on data collected with XCCF or other methodologies for purposes of mathematically identifying pending failure conditions or other undesirable situations lack universal or openly available mechanisms to determine from the data collected what is the root cause of an issue, particularly when advanced analytics are employed to determine if there is an issue and what that issue is. Such PNM applications, i.e., those having static, proprietary, hidden or other fixed or obfuscated structures, may process the collected data as an input and generate corresponding outputs without enabling network operators or technicians responsible for maintaining the related network sufficient review, monitor and manipulation of intermediary processes, analytics, mathematics, data collections, activities and inner workings on-going between input and output.

The lack of visibility or capability to intercede in the execution of PNM applications for purposes of adjusting or checking data or otherwise making use of the data while being processed with the PNM application limits the capabilities of such PNM applications to a fixed set of stagnant operations. One non-limiting aspect of the present invention contemplates a need for proactive operations (ProOps) whereby a suitable platform, framework, architecture, etc. may be defined for constructing operations that turn network data into action, such as in a manner sufficient for use with PNM applications, dashboard applications, or other uses whereby the contemplated ProOps may be beneficial in enabling network administrators to assess device operations using measures of performance sufficient for estimating benefits achieved by completing configurable, selectable, and manageable ProOps. The contemplated ProOps platform may be useful in providing low-impact queries for data whereafter work items or workflows can be undertaken to drill into more data when desirable to provide building blocks for PNM applications, such as to take corrective action before customer disruption occurs.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
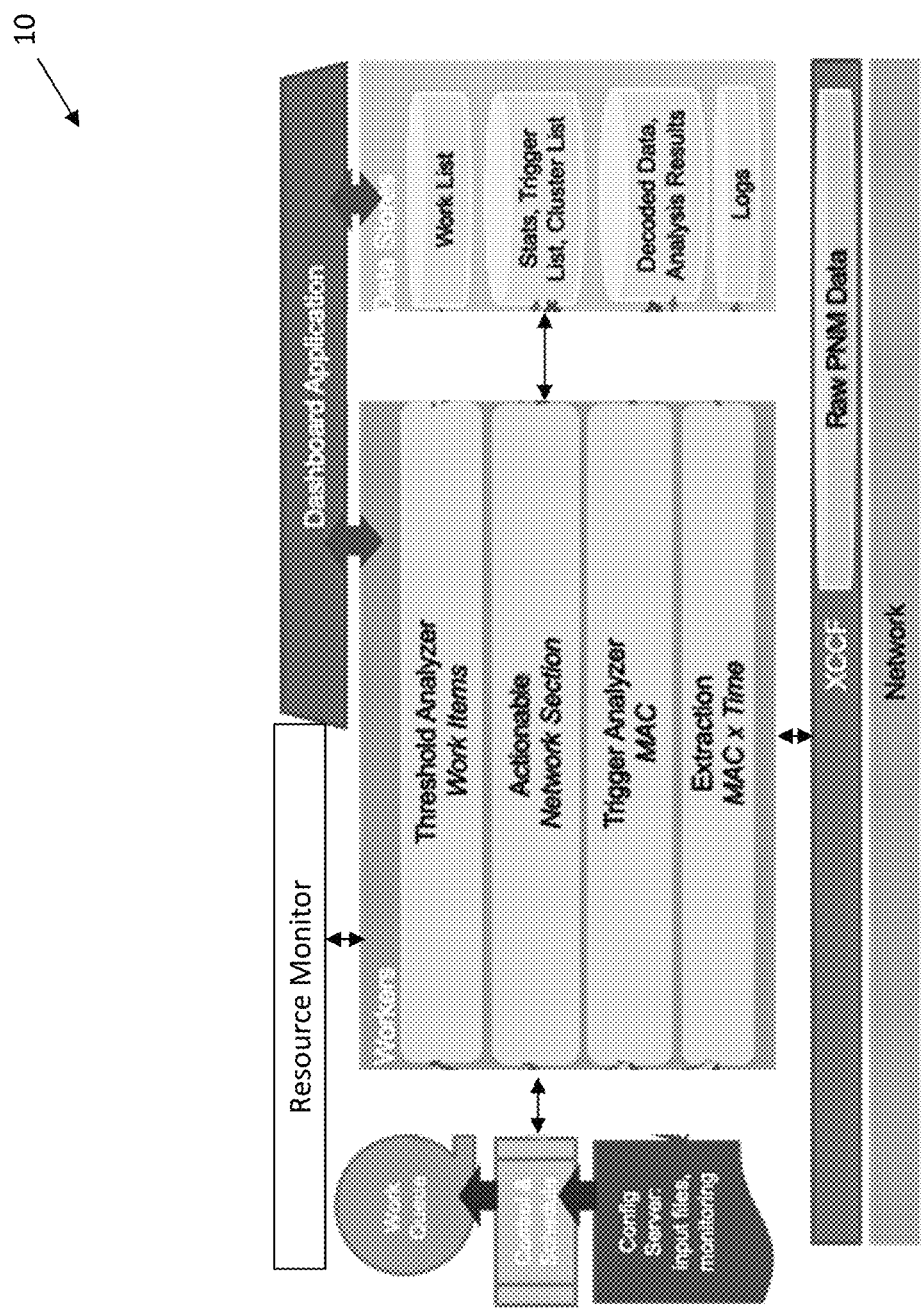
FIG. 1 illustrates a proactive operations (ProOps) platform in accordance with one non-limiting aspect of the present invention.

FIG. 1 illustrates a proactive operations (ProOps) platform 10 in accordance with one non-limiting aspect of the present invention. The platform 10 may be utilized as a framework for constructing applications, operations, workflows, etc. capable of turning network data into action, such as by facilitating an application environment where an XCCF collects raw/observable data collected or otherwise obtained from a network, a system, or another construct in order to facilitate assessing operations of devices, network elements, components, etc. associated therewith. The platform 10 may facilitate individual action over a network to proactively adjust output device operations before disruption or other undesirable influences on subscribers occurs or for other proactive measures, such as to provide information to dashboard applications. The action may result from data processing performed as workers, modules, layers, workflows or the other coordinated activities execute various tasks to turn data into action. While the present invention may be predominately described with respect to data collected from devices while deployed in a cable plant, similar processes may be performed without deviating from the scope and contemplation of the present invention in non-cable plants and/or with non-deployed devices. One aspect of the present invention particularly envisions devices being tested in a laboratory or in other environments whereby disruptions in operation may not influence subscribers or end-users but nonetheless measure performance in anticipation of being deployed.

The platform 10 may be used as a basis for testing new ideas and concepts in PNM, including machine learning and any number of analytics, optionally with manipulation and visualization being implemented at any time using a resource monitor. The network and the XCCF may be used to illustrate an environment and data collection platform suitable for assessing network and non-network deployed devices in any suitable environment, and as such, virtually any other system, environment, or mechanism may be substituted for the network and/or the XCCF without deviating from the description herein. The data collected with the XCCF and noted as raw PNM data may be referred to as raw data for explanatory purposes to facilitate differentiating data transformations as the initial intake of raw data changes with progress through the ProOps platform 10, i.e., as the raw data is manipulated to provide building blocks for PNM applications, machine learning processing, analytics, visualizations, etc. A configuration server may be used to host the configuration data used to define messaging mechanisms and additional configurations necessary to facilitate the contemplated data processing, which for illustrative purposes may be achieved through implementation of a plurality of workers.

The plurality of workers may be characterized as individual constructs capable of facilitating a particular function according to instructions associated with a corresponding configuration file when executed with the configuration server, e.g., the workers may be implemented through processor execution of corresponding instructions stored on a non-transitory computer-readable medium. A control and schedule section may be used to handle the scheduling of workers and to control task creation and ending as needed to handle the processing of the workers. The tasks may be used to describe processing of the data that each worker is fed, the data that each worker outputs, where the outputs are held, where the inputs are obtained from, and any additional information for specific workers, such as thresholds, IP addresses of CMTSs and XCCF, etc. A work queue may be a first-in, first-out (FIFO) queue of the tasks to be done by the workers according to the schedule dictated by the configuration server. The configuration server may include configuration files or other instructions sufficient for facilitating implementation of the control and scheduling, queuing and execution of the workers. The workers may exist in a pool organized as dictated by the configuration server in order to essentially provide the software componentry for the tasks intended to facilitate the operations contemplated herein.

An extraction worker may facilitate an extraction of the raw data from the XCCF as dictated by the initial schedule outlined in its configuration file. Because this may include data for the same MAC addresses being collected multiple times on a schedule, the corresponding function may conduct data collection according to a MAC by time (MACx Time) schedule. The output of the extraction worker may be stored in a logs portion of a data store maintained with the configuration server as well as in a decoded-data-analysis-results portion of the data store. A trigger analyzer worker may analyze the data from the extraction worker and determine whether a change of action is triggered, such as obtaining new data elements, taking data elements on a different schedule, collecting data from related network elements, and placing some of these MAC addresses on a list that identifies further action. The trigger analyzer worker may analyze data on a single MAC over time such that it may be labeled as scheduled according to MAC. The output of the trigger analyzer worker may include statistics and a determination of which MACs is/are triggered, i.e. the individual MAC/devices associated with data sufficient to trigger a decision as to whether further analysis or other action based on the data should be implemented.

An actionable worker may process the MAC addresses flagged by the trigger analyzer to determine the network section relevant to the identified MACs. A clustering of MACs may be done, and to make these actionable, a measure of performance and comparison may be introduced for these MACs or clusters of MACs so that decisions can be made to bring the network section to actionable work. The output from the actionable worker can be clusters of MAC addresses, or single MAC addresses representing network points or devices/CMs and/or statistics to support decisions, which may be stored in a stats-trigger-list-cluster-list portion of the data store. A threshold analyzer worker may assess a measure of performance and comparison, introduce further analysis of other MACs in a cluster, look at historical information and decide which of the identified actionable network sections may be reasonable candidates to act upon based on information provided in the configuration server. The threshold analyzer worker may conduct analysis on work items and provide output to a work list portion of the data store.

A dashboard application may be fed by the entire set of identified data, such as to generate GIS maps, graphs, and detailed work packages, which can be assembled as needed by whatever system intends to utilize the data output from the ProOps platform 10. This approach may allow most any operator to take the output from any individual one or more of the various steps of ProOps platform 10 or its entire output and tie it into its existing ticketing systems and other operational needs, such as to take proactive action against service disruptions or other undesirable condition before being experienced by customers. In this manner, the dashboard application may be used as an information interface with systems of an operator and the resource monitor may enable the operator to visually inspect any portion of the data, i.e., the output from any one or more workers, and if desired, to manipulate the processing and other operations of the workers and/or the related action. The capability of the present invention to interface data with operator systems using the dashboard application and to allow operators visibility and variability in controlling operations of the ProOps platform 10 is believed to be more beneficial than PNM applications having static, proprietary, hidden, or other fixed or obfuscated structures incapable of enabling network operators or technicians being able to sufficiently review, monitor, and manipulate intermediary processes, analytics, mathematics, data collections, activities, and inner workings on-going between input and output.

The control and schedule may be a special worker that interacts at the system level to control the other workers, follow the application and flow defined in the configuration file, and schedule work according to the task description or conditions discovered from the other workers or their data output. The tasks may be posted periodically by the schedule worker to the task queue(s) and assigned to workers by subscription. If a configuration instructs data collection to happen every x hours, then this worker may schedule work for the queue based on this schedule. Further, if a result from a data poll and analysis indicates triggering a rule given in the configuration file, then this worker may update the schedule it follows for those impacted CMs accordingly, and therefore change the schedule that dictates how it places work on the work queue. It may therefore hold state but can regain a lost state by reading the config data and the information in the data stores, as those are sufficient to define the schedule. If this worker is responsible for monitoring a trigger condition to instantiate a worker, such as a ranker worker, then it may have access to the data or worker output that triggers the follow up work. If instead it is to act on a schedule only, then maintaining the time against that schedule may be important, but not catastrophic if state is lost. The log file could be used to capture time and a backup of control and schedule state to avoid a loss of state at failure. This special worker may also regulate the system so to not tax the network too much, and to poll and archive data based on scheduling requirements from the application configuration. The control and schedule worker may read the config data, build a schedule for how other workers are started for data collection, then create the needed polling workers at the appropriate time. The control and schedule worker may be the worker type that keeps track of timing and needs to maintain some state information.

The work queue worker may be used to provide a queue of work to be handled by the individual workers. The control and schedule worker will place work on the queue for other workers, and likewise another worker can generate a job for the control and schedule worker to handle. The work queue may manage the work and assignments, holding the work to do like a pipeline connecting work to workers. In one contemplative aspect of the present invention, workers may be created to handle tasks, and the work to be handled arrives in a queue. The control and schedule worker may handle all timing for scheduling and assigning of work to the other workers. Based on this concept, additional workers may be considered to be part of or included with the illustrated workers such that each of the extraction, trigger analyzer, actionable and threshold analyzer worker may each include additional workers of various types to facilitate generating the desired output of data. The present invention describes a few of the envisioned workers for exemplary purposes, and fully contemplates other types of workers be defined at will, such as through the capabilities available with the resource monitor. The illustrated layering of the ProOps platform 10 may be considered as a framework that facilitates action to support a network and services. The configuration file referenced above and described additionally below may be what enforces the construct of the overall system, and therefore the workflows or applications built in the environment.

The extraction worker may include a polling worker, a translator worker, and a linear calculator worker. This may be a pool of workers that form a linear processing of data from the XCCF. The polling workers may interact with the XCCF to poll the data. The data received may then be translated by translator workers if and when necessary, and finally processed by linear calculator workers. The linear calculator worker may be a calculator worker that may be always applied to data right off of the XCCF. The outputs may be cataloged into the Decoded Data and Analysis Results data lake or database by a catalog worker (if needed).

The trigger analyzer worker may include a calculator worker, an anomaly detector worker, a machine learning worker and an analyzer worker. This may be a pool of workers who evaluate data as it shows up in the decode-data-analysis-results portion of the data store against the analyses invoked and configured by the configuration file, which may result in placing statistics and a list of triggered MAC addresses into the stats-trigger-list-cluster-list portion. The control and schedule worker may monitor the database for new data to trigger the need for a specific worker type, or monitor a clock to trigger, based on the configuration file. It may then schedule the appropriate workers to complete the configured tasks. The calculator workers will calculate statistics from the data and place the statistics into the database. The anomaly detector workers may search a series of data (over frequency, time, etc.), indicate the data included in a detected anomaly, and in some cases indicate the class of anomaly detected. The machine learning workers may apply other machine learning techniques to data and statistics. Both the latter worker types here may contain or use calculator workers, for example, too. The analyzer worker may assess these outputs against the triggers indicated in the configuration file. The output from these analyses may be tasks that can be to sample new data or sample some data sources for specific MACs more frequently or to re-analyze older data, etc. The configuration file may hold information about the frequency of data collection for the default data frequency and it may also hold information about the triggers and actions from triggers regarding data polling frequency, but as conditions as opposed to system state. Changes in system state may be held in memory or, in the case of MAC addresses subject to frequent polling, in the stats-trigger-list-cluster-list store. This capability enables workers to relate to all other workers in a nesting, series, parallel, or other configuration relationship, while also enabling operators via the resource monitor to define additional workers.

The actionable worker may include a severity calculator worker, a ranker worker, a cluster worker and a relational worker. This worker class may contain a few worker types (depending on the nature of the application configured) tasked with translating the trigger list and collected statistics and data for triggered MAC addresses and providing the necessary performance measures with which to rank the MAC addresses. It can work exclusively with the stats-trigger-list-cluster-list database as it reads the information, processes, then adds an updated measure of performance to the data and provides an updated ranking. The configuration file may be correspondingly set up to provide the needed data to supply the measures needed for action and/or adjusted as needed through the resource monitor. The work can be done periodically or triggered by a condition, such as a number of data updates on the triggered list or a number of new entries to the triggered list. The control and schedule worker can trigger action as directed by the configuration file and trigger a severity calculator worker based on the information in the configuration file which specifies what triggers the calculation. Once the calculation is updated, the ranker worker will evaluate the updated measures of performance and rank the MAC addresses by severity, placing the performance measures and the ranked list back into the database. The cluster worker may evaluate the information relating to the MAC addresses and to cluster them by similarities in the statistics and performance measures, which may include accessing the raw data or decoded data or analysis results. Either on a schedule or as triggered by conditions, as specified in the configuration file, the cluster worker may be started to evaluate triggered MAC addresses and their performance and other needed information, conduct clustering based on multiple dimensions of data, and output clusters of MAC addresses that are likely experiencing the same problem.

The threshold analyzer worker may examine the trigger clusters, which may be assumed to include clusters defined by single MAC addresses in many cases, and decide which of the clusters may be actionable. This can be done through the configuration file, which may hold the rules that trigger the action based on an external financial model, operations rules, workload, number of potential jobs on the list, etc. The control and schedule worker may read the configuration file to determine when or under what condition to trigger a sorting of the opportunities in the trigger cluster database (and potentially the trigger list). The sorting may be done by the threshold analyzer sorter worker which will read the configuration file to determine what measures to use in the sorting, then gather the information it needs, and finally sort the opportunities into a dispatch list. An output of this group of workers may also be a measure of performance that is used for ranking, but potentially also additional measures for ranking or consideration including but not limited to an estimate of the benefit achieved by completing the associated work package.

The configuration file, which may include one or more configuration files for each of the workers or groupings of workers, may be used to refer to the computer-readable instructions executed with a processor at the configuration server to facilitate the ProOps platform 10. The configuration file may be stored in non-transitory medium associated with the configuration server to define the application from the ProOps elements, and to control how the application functions day to day. There may be several types of configuration information needed for this workflow, and that information could be stored in a single file, or multiple files, or in a database for example. It could be edited in a file editor, or through a GUI defined for the application, such as with the resource monitor. The files could be separate or together or organized in any way, such as with an interface having organization to configure workers and general parts of an application. An extraction configuration file may be used to facilitate the extraction worker, such as by specifying the frequency of polling for each data element, which data elements are polled as part of the application and/or how to handle missing data, timeouts, and other problems that may be encountered in data polling. A trigger analyzer configuration file may be used to facilitate the trigger analyzer worker, such as by specifying which analysis workers are included in the application or workflow and how they are started (such as when data appears in the Decoded Data and Analysis Results database or data lake). It may also include the rules by which CMs are triggered for action to the next level, and flagged for ranking, plus what workers need to do to support the action layer. An action configuration file may be used to facilitate the actionable worker, such as by containing details of the model for the measure of performance for CMs based on their statistics and trigger state. The model may be complex or simple, depending on how data over time or missing data are treated, and whether a non-linear model is needed. It may also specify what to use for ranking and/or provide information for how to cluster CMs, essentially controlling the model for clustering, but also specifying the worker that is used. A threshold analyzer configuration file may facilitate the threshold analyzer worker, such as by providing rules by which opportunities (clusters or individual CMs) may be ranked and sorted, included or excluded, on the dispatch list. It may also specify how often the list is revisited and updated, which means how often the clusters and individual CMs are analyzed.

The data store may include the illustrated data stores, optionally without each store being distinct, but it may be advantageous to keep them in solutions suited best to their forms, and therefore desirable to be distinct in at least some way. The raw PNM data can be kept in the REST API of the XCCF, or in the TFTP server used by the operator, or in a separate data lake. As the data held here may be disparate, it may be beneficial to store separately and can be characterized as raw data to be subsequently orientated with the extraction worker to remove disparities before being stored for use with other workers. The decoded-data-analysis-results store can be used to store data and analysis results, which optionally may be held between MAC, time, and data. The data can be contained in a relational database as it can contain decoded data and statistics of multiple types associated with individual CMs by type, time of day, etc. the stats-trigger-list-cluster-list store can be contained in a relational database to keep statistics of multiple types associated with individual CMs by type, time of day, etc., optionally with a separate related list of the CMs that meet the threshold for triggering based on the rules set in the configuration file. The cluster information can be held in a list, a database, or other simple form of how the CMs may be clustered in common groups for PNM work opportunities. The work list store may be a list of CMs or CM clusters which are opportunities for work. Each item on the list may have a performance measure that indicates how critical the problem is, or how large the proactive opportunity is, so may even be an expected benefit in dollars, for example. There may be links back to the supporting evidence for the decision to add this work to a dispatch list, and to help with troubleshooting. The logs store may keep a list of system logs for overall system health. This may be a method to maintain state under failure too.

A CM may only respond to one request at a time, or very few. But if a CM doesn't respond at the time data were requested, and there is reason to expect it should, then a retry may be in order. XCCF jobs may have three states: accepted, complete, and failed. Some complete jobs may have incorrect, errored, or incomplete data responses as well, so a complete job may still be a failed job. The parsing of the data output may result in a new fourth state of complete but errored such that the state of a completed job from the XCCF may create subsequent requests to be scheduled based on the final job status. If the job status is complete, and parsing yields a correct output, then the next job may be scheduled according to the instructions in the configuration file. If the job status is complete but errored, or failed, then a new request may be scheduled immediately or after a short amount of time as specified by the configuration file. The configuration file may also state whether subsequent jobs or tasks may be scheduled based on the completion time of the last job or based on a system clock. If a data type is requested 6 times a day, and the first one is delayed by an hour, then the next data request happens in 3 hours or 4 hours or will be otherwise configurable in the configuration file, such as through manipulation implemented with the resource monitor. The control and schedule worker may need to sort jobs on a common system clock. The configuration file may account for missing data in the way we analyze and calculate performance measures. A non-responsive CM may end up on a separate list.

Figure 2:
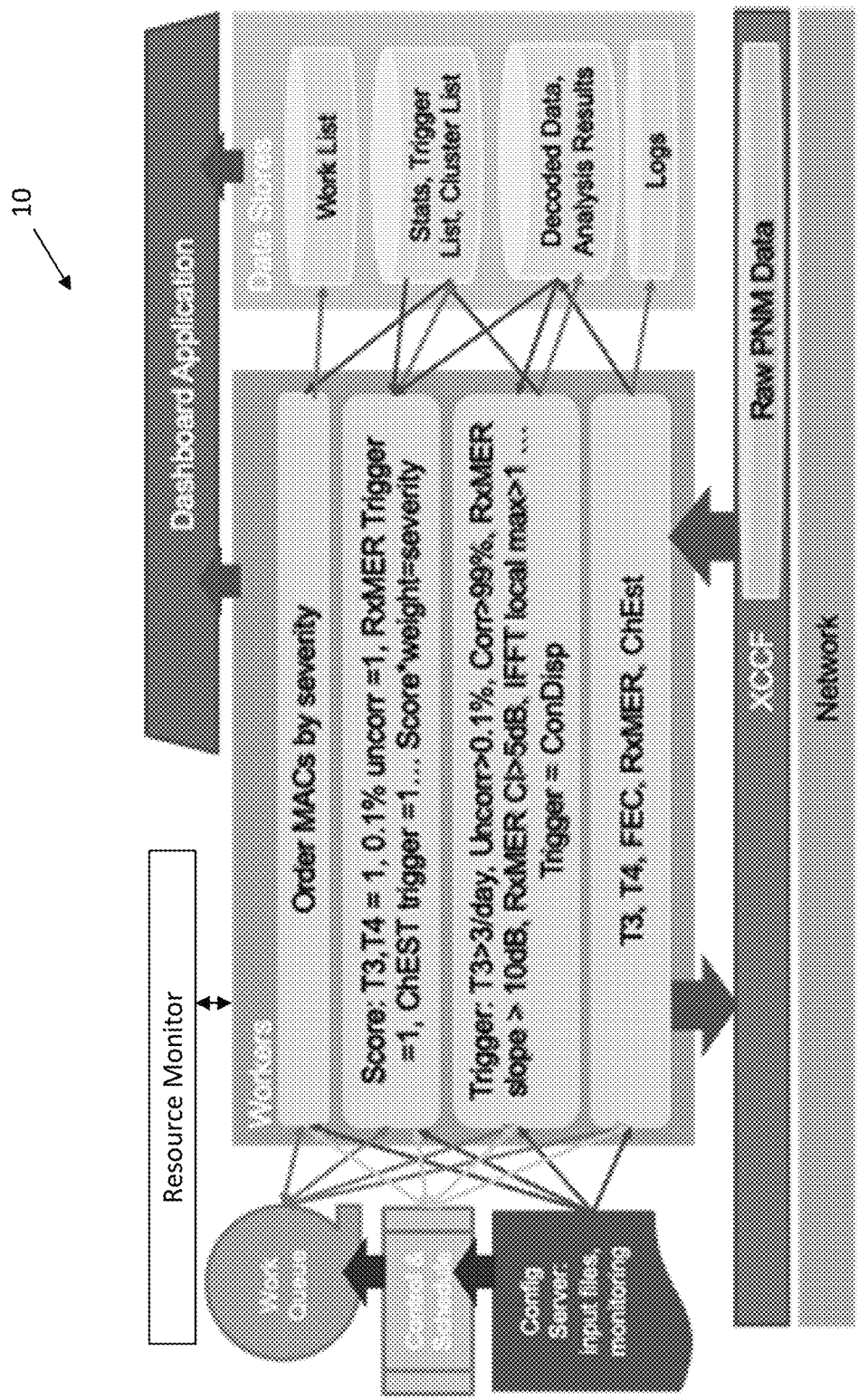
FIG. 2 illustrates an exemplary execution of the ProOps platform to facilitate an analysis package in accordance with one non-limiting aspect of the present invention.

FIG. 2 illustrates an exemplary execution of the ProOps platform 10 to facilitate an analysis package in accordance with one non-limiting aspect of the present invention. The analysis package may be defined using the resource monitor capabilities to include, for example, the following parameters for collecting data: base data polling (pollers); pull T3 & T4 errors, and, from CM logs every hour (configurable); pull FEC stats every hour (configurable); pull RxMER every 4 hours (configurable), and SpecAn the same but staggered (opposite cycle, configurable); pull Channel Estimation and Pre-Eq every 4 hours (configurable) at same time. The analysis package may also define the following triggers for analyzing the collected data: repeating errors at a configurable frequency, e.g., more than 3 per day, (configurable); uncorrectables higher than 0.1%, correctables at 99% or higher for over an hour (all configurable); RxMER and SpecAn results indicating anomalies, or with a slope greater than 10 dB (configurable); trigger any RxMER with a 95% confidence interval greater than 5 dB, which may be calculated from percentile responses (configurable); look for ripples in either or both by IFFT with an energy spike; take the largest continuous segment of data from either and transform (IFFT) it into time domain, then search for local maximum; defining each result with more than one local maximum being considered as triggered, which may remove the high frequency main energy as part of anomaly detection; transform to distance and severity of echo tunnel, trigger anything higher than 10 dB, configurable, which may optionally use RxMER; ChEst or PreEQ indicating a range greater than 10 dB (configurable); look for ripples in either or both using same method as above; transform to distance and severity of echo tunnel, trigger anything higher than 10 dB (configurable); ConDisp extracted after other issues were found, such as FEC, T3, T4, RxMER issues, which option may be a plot and calculation of stats for mean, variance, and/or third moment. The analysis package may also define the following actions: apply a weight to each trigger type (MIB and trigger) to a given measure could have more than one trigger); score 1 for each error or boot issue; score 1 for each percent uncorrectable; score 1 for each trigger found anomaly (RxMER, SpecAn, ConDisp); score 1 for each trigger in ChEst and/or PreEQ; each day, multiply the score by the weight (score*weight), and sum the results for each CM each day; use an EWMA scheme to get the CM their final scores over time, such as with a worker that can be changed with other approaches in PNMANE; since each CM triggered will have its frequency of data collection doubled, configurable for each measurement such that after having a 0 score*weight for 3 full days, configurable, will a CM be removed from the action list.

Figure 3:
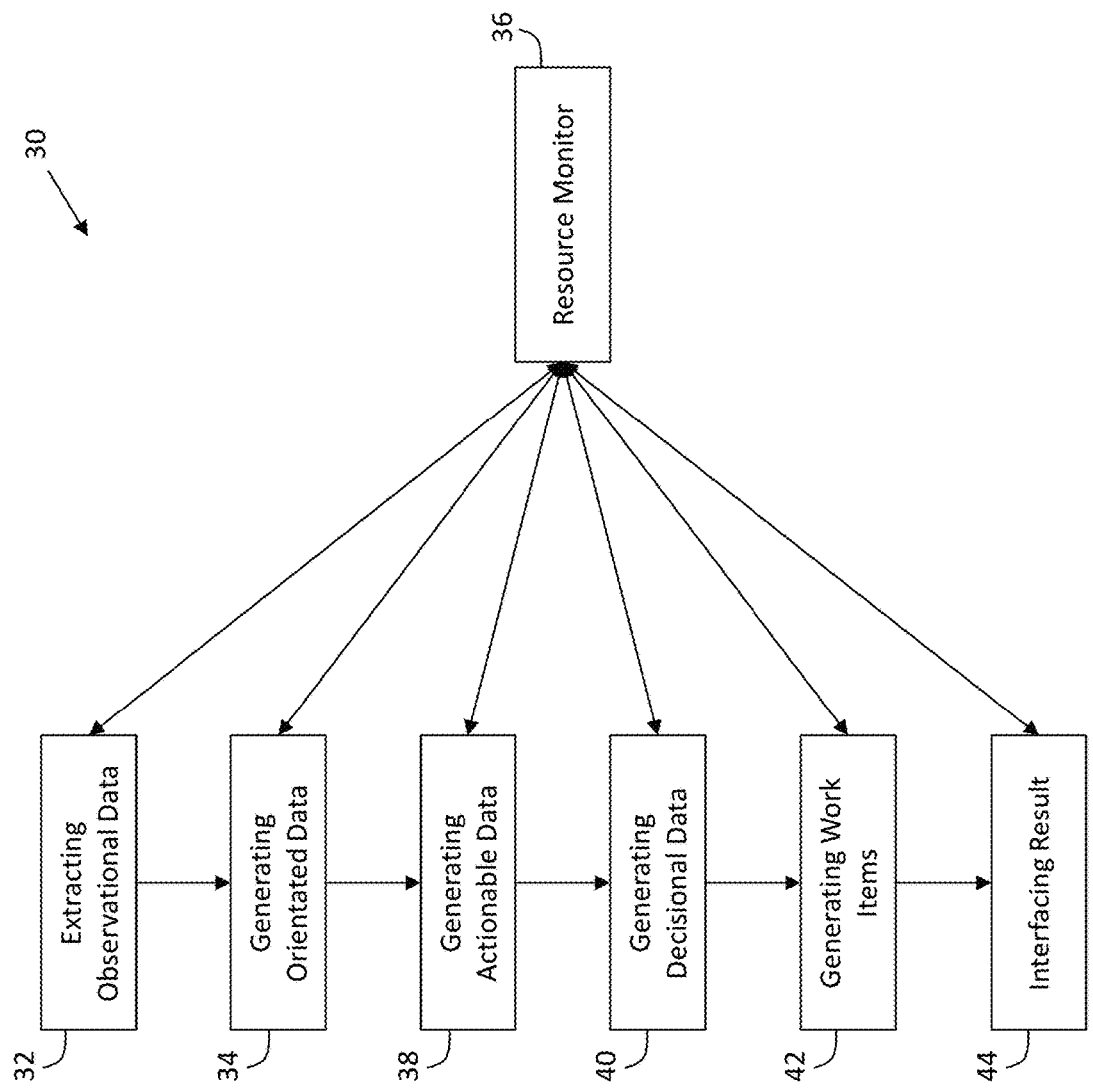
FIG. 3 illustrates a ProOps based method for assessing operations of a plurality of devices connected to a network in accordance with one non-limiting aspect of the present invention.

FIG. 3 illustrates a flowchart 30 for a ProOps based method for assessing operations of a plurality devices connected to a network in accordance with one non-limiting aspect of the present invention. The method may be facilitated with execution of instructions stored on a non-transitory computer-readable medium, such as with a processor of a configuration server or other entity having capabilities sufficient to facilitate the contemplated ProOps platform 10 and methodologies for processing data into action. The illustrated method presents one exemplary implementation of the ProOps platform 10 to facilitate various actions based on observational data collected by XCCF or some other interface for the plurality of devices. The platform 10 may enable an operator or other user to visualize data while being processed from input to output in a manner believed to be beneficial in providing a structured methodology for assessing operations according to mathematically driven analysis. The method may be particularly beneficial in facilitating computation of data whereby each stage of assessment may be viewable to and manipulatable by an operator through the resource monitor, such as to enable the operator to adjust triggers, performance measures or other variables until a desired work package is reached. The operator can review collected data during its processing and before implementing work packages to execute corresponding actions to assure the longer-term collection processing of data meets desired assessment goals.

An extracting observational data process 32 may commence the method by retrieving observational (raw) data from a collection platform, such as an XCCF. The observational data may include disparate formats, structures, protocols or other schema for reporting operational information or other metrics depending on the associated device, e.g., some devices may be of the same type but operating according to different protocols and messaging structures such that communication of the operational information or metrics may be disparate reflections of the same category of information. A generating orientated data process 34 may be used for orientating the observational data into orientated data sufficient for orientating the operational information in the observational data to account for disparities, i.e., to translate the disparate nature of the observational data to a standard or uniform format. The extracting observational data process 32 and the generating orientated data process 34 may correspond with processing performed by workers associated with the extraction worker. A resource monitor process 36 may be implemented at any stage to facilitate adjusting resources being consumed and/or operation of the attendant process, e.g., actions may be undertaken through the resource monitor to adjust the workers for purposes of making changes to the observational data being collected and/or to how the observational data is being translated or otherwise manipulated into the orientated data.

A generating actionable data process 38 may be used for trigger analyzing the orientated data into actionable data of the type suitable to facilitate subsequent decision making. The associated data may be considered as actionable due to the attendant processing turning the newly orientated data into a form upon which action can be based, i.e., information of the type suitable for assessing whether the values, variables or other included information are sufficient for the use in subsequent decision-making. The generating actionable data process 38 may correspond with processing performed by workers associated with the trigger analyzer worker, which may be useful in enabling additional data beyond the orientated data to be created, such as to reflect results generated from additional calculations, anomaly detection, machine learning, etc. The resource monitor process 36 may be utilized with the generating actionable data process 38 to assess whether information meaningful for subsequent decision-making is being obtained, e.g., take a look at the data to assess whether additional changes should be made before the data is acted upon in a decision-making manner. The actionable data may result in creation of statistics, trigger lists or other representations indicating mathematical results relative to thresholds or other performance measures set in the configuration file.

A generating decisional data process 40 may be used for sectioning the actionable data into decisional data sufficient for representing decisions made on tasks to be performed to assess operations. The generating decisional data process 40 may be implemented with workers associated with the actionable worker, such as to enable severity calculations relative to thresholds or performance measures, enable a relative ranking of the severity calculations, to enable clustering portions of the network relative to thresholds or performance measures, and/or to assess whether there may be any relationship between devices having similar severities. These workers may assess the actionable data surpassing thresholds, triggers or other decision-making parameters having boundaries whereby corresponding actions may be implemented if surpassed. The resource monitor process 36 may interact with the generating decisional data process 40 to check on whether the decisions to act should be executed, e.g., whether the thresholds or triggers were suitably set and/or to provide operators visibility into the results further analysis. Having visibility to the decisional data in this manner may be beneficial in enabling operators to assess data at a stage before actions are executed but sufficiently after the refinements successively added with generation of the orientated data and the actionable data processes.

A generating work items process 42 may be used for threshold analyzing the decisional data into work items, workflows, tasks, etc. of the type suitable for turning the collected information into action. The actions, whether proactive corrections to devices or information interface with a dashboard application or operator, may represent the turning of information into action whereby mathematical and other data processing may be leveraged to create different layers or structures of data resulting in tasks or other execution based on the data modeling. The generating work items process 42 may be facilitated with the workers of the threshold analyzer worker, the work queue worker, and the control and schedule worker to effectively turn the information/data into action of the type whereby corrective measures may be implemented before subscribers notice a related disruption in service. An interfacing result process 44 may correspond with execution of the work items. This may signify an output or other result whereafter communications to adjust or modify operations of the devices may be undertaken automatically, such as to proactively implement remediation before client disruptions, and/or instead of controlling the devices, information may be interfaced with a dashboard or a system associated with plant control. The tasks to be executed by the relevant workers may be defined in a work package or other construct to facilitate the desired output, e.g., different tasks may be defined to automatically implement changes to device operations versus tasks used to interface data with operators.

One non-limiting aspect of the present invention contemplates the ProOps platform 10 being beneficial in not only enabling network or system operators to collect and store data in a structured manner using capabilities to visualize and manipulate the data in-process before output or usage but to also enable the generation of actions capable of being automatically implemented with a computer or other communication tool to correspondingly support device PNM, quality of service, etc. The ProOps platform 10 may include the described workers to facilitate successively processing data into different data containers or storage portions of a data store in order to enable operators ready access to pre-process or other refined data relevant to particular inquiries, e.g., the operators can access using the resource monitor any of the outputs stored from worker processing in order to analyze related data without having to newly generate processes and other mathematics needed to obtain the same information. While the workers and related processing may be easily manipulated or varied through interactions with the resource monitor, the ProOps platform 10 may optionally include key workers to facilitate certain metrics, such as to facilitate assessing responsiveness and reliability for cable modems (CMs) in a cable plant, IoT devices, any network device or any entity reporting data.

With respect to assessing responsiveness, the ProOps platform 10 may include responsiveness related workers for generating statistic-data with workers that: poll a PNM statistic on each of a set of modems at a frequency of x; parse the collected response to determine for each CM whether a response was obtained and whether the obtained response was correct (parse-able, match a specification, etc.); collect statistics on whether the response was received or not, whether the response was correct or not and whether a received response was correct or not (the conditional statistic); and to collect these statistics over a period of time in what may be referred to as statistic-data. The ProOps platform 10 may also include responsiveness related workers for generating a stability check and defining a baseline with workers that: check for stability in the data set using statistical methods outlined below or another suitable method; use the statistic-data for the baseline if there is no statistically valid reason to assume a time effect in the statistic-data; and remove the later statistic-data iteratively until the remaining statistic-data indicate no time change and call the remaining statistic-data the baseline if there is an indication of a time effect.

An example for using the responsiveness related workers may be understood by assuming there are n modems sampled m times, with t time between each sample. Each modem could get a 0 if it fails the three tests: responded (first statistic), responded correctly (second statistic) and given it responded did it respond correctly (third statistic). For each of the m samples, for each test, an integer value from 0 to n may be obtained. The sample size of the first two statistics is n, but the sample size of the third statistic is the number of successful responses which is the statistic for the first test. For all three test statistics, the p value is the number of successes divided by the sample size, and the variance is $p*(1-p)/$sample size, which is n for the first two statistics. The standard deviation is the square root of the variance. The responsiveness related workers may be sufficient to apply standard statistical quality control rules to the data to determine if there are outliers, or other indications of a trend. These rules may include: one or more point outside control limit (3 sigma); a run of at least 8 points on one side of the mean or median, or where each is an increase from the previous, or each is a decrease from the previous; two of three consecutive points outside 2 sigma; four of five outside 1 sigma; and/or one or more points near a control limit. In the case of CMs, because it may be advisable to limit searching to deviations in trends, the first and last of these rules may be ignored.

The responsiveness related workers, in answer to finding any violation of the remaining rules, may implement workers to take the data set in question to: find the latest data point in the set that is violating one or more of the test rule; remove that found data point and all others after that point; and revisit the test conditions for collecting the data and consider taking a new sample with better test control if removal of the data points would result in less than 20 data points; or otherwise, recalculate the control limits and reapply the three rules from above. If there are no violations, the remaining data set may be used as baseline statistics. The responses lists related workers may take the baseline set of statistic-data to: generate pass-fail encoded as 1 or 0 for each CM; calculate the proportion (a binomial statistic) for each CM type for each of the three statistics, as well as the standard deviation of the binomial statistic; and use the results to define a control chart for each modem type, and for calculating quantiles of responsiveness availability, including confidence bounds (limits). In this manner, the ProOps platform 10 may be useful in determining an availability measure in terms of modem response to a data request.

The baseline proportions for each defined statistic may be the statistics for modem performance. These statistics can be compared to specifications from operational requirements or system design. Alternately, population samples can be compared to performance requirements at a given confidence level. For example, a 3-sigma limit on a population CM performance of P would be a requirement of the sample performance to be at least as good as $P-3*P(1-P)/n$ where n is the sample size; so the sample p must be better than $P-3*P(1-P)/n$. The resulting statistics are suitable for benchmarking performance, in this case specifically the performance of PNM measurement reporting availability by CM type. The responsiveness related workers can repeat this process for various polling frequencies and report each frequency separately if it has an impact on the CM, which could be a line or a function responsiveness by polling frequency. This capability maybe useful for determining the number of times to do polling in order to obtain a useful result for testing or field performance.

With respect to assessing reliability, the ProOps platform 10 may include reliability related workers that: project a time effect and correspondingly look for patterns that indicate how long before a reliability shift and whether the shift results in a stable change, or a trend, or what is indicated as a degradation in performance. The ProOps platform 10 may also include reliability workers that: look at the individual modem response data to see if there are modems that stop responding completely, or at least to a less than useful degree of frequency; and translate the responsiveness data into lifetime data to apply lifetime data analysis methods to determine a parametric or empirical model of the reliability of modem responsiveness if the data appears to fit that description. This may include reliability related workers that, for each CM, translate the success (1) or failure (0) data into lifetime data using the following: conduct a moving average of the data in sizes of j consecutive data points, the value of j chosen can be 8 to reflect the run rules if desired, or set to any size of run indication desired, such as, if operationally a modem that doesn't respond by the fifth request is considered unresponsive, and therefore cannot be useful, the sample size of the moving average can be set to 5; take the resulting data and round up to the nearest integer. If the data set contains a 0, the workers may consider every data point after the first 0 to also be 0 in case the data shows that the modem starts responding again but would still be considered unresponsive.

The reliability related workers may facilitate a non-parametric approach to create a modem responsiveness reliability metric by using a product limit estimate of the survival function first. For a given t, the reliability related workers may implement the survival function as follows: for each time the data were taken from the set of modems, note the number of modems being tested that were active just before the test and the number of modems that are found to be failed; at the test start time of $t=0$, the survival function is 1.0; at the first time the modems are tested (say if modems are tested every two hours, then $t=2$), the survival function estimate is the number of still functioning modems at that time $(n\_1-d\_1)$ divided by the number of modems working just before (for $t=2$ in the example then, which is sample 1, we have $n\_1$ as the full set of modems tested); and each subsequent test then has a survival function defined as the product of the previous survival function result times the new calculation of $(n\_i-d\_i)/n\_i$, where $n\_i$ is the number of surviving modems on the previous test time, and $d\_i$ are the number of modems that since stopped responding. The resulting survival function can then yield a few useful measures of performance: the function itself is an important measure for consideration; quantiles of the survival function are of use, such as 90% ile, 50% ile, etc., as the data provide; if the data were not collected to get lower quantiles, then a parametric model can be used to predict the lower quantiles, such as to calculate the slope of a fitted line to the survival function and report on the time to no modems in the population reporting and the slope of the line itself; and/or if there is sufficient reason to believe there is a consistent comparable curve in the data, a parametric model may be utilized.

The capability of the ProOps platform 10 to facilitate responsiveness and reliability related workings may be used in the following:

Optimal Polling Quantity: Using the availability measure, or the reliability measure with an assumed age distribution, an estimate can be provided of the likelihood a random sample from the selected population will respond to a polling query. Utilizing this estimate, the polling quantity can be set to yield a sufficient number of good responses for a given probability. For example, to be 95% certain of getting 100 good samples from a type of CM that responds with 90% availability, we can sample approximately 119 to be 95% certain of getting 100 good responses, using a binomial model.

Predictive Reboot: Using the reliability estimate, a goal of responsiveness for CMs can be set for determining the age of the software before requiring a reboot to meet target response rates. For example, if a type of CM with a fresh boot will respond at 99%, then lose 10% each week, after 5 weeks it is below 50% responsiveness. At that rate, to obtain sufficient polling responses and monitor the network, there are significant network points that no longer are visible. Therefore, after 5 weeks, certain CMs can require reboot to assure those CMs can respond again to monitoring needs.

CM Polling Retries: Based on a given polling frequency tested for a type of CM, it can determine responsiveness measures (reliability and availability). A database check of when the CM was last polled can be made, and using that, based on the time since last responded, it can be determined if the CM may be polled again or if polling must wait before the CM will reliably respond. If the CM is polled and does not respond, that can be used to examine probability and make an intelligent decision automatically as to when the next polling attempt should be made.

CM Certification/Acceptance: The reliability and availability measures of CM responsiveness can be output for use as part of CM certification or product acceptance by an operator. Further, target numbers can be set for certain CM quality levels, and a CM batch can be measured in the lab to estimate its reliability and availability of responsiveness. These measures can be compared automatically to specifications, and automatically fail the specification or pass depending on the measured performance. If there are multiple quality levels, then the measurements can yield more granularity than simple pass-fail, such as a quality level 1 through 5 so that the best CM results can go into the network where needed (for enterprise level services, medical applications, etc. for the higher quality CMs, or into sparse areas of the network where monitoring will be more important).

Software Quality Selection: A new build of software on a CM can yield different results in terms of CM responsiveness. A baseline can be measured from a known good build. An update to the software can be installed into a set of test CMs. The new population can be measured for responsiveness reliability and availability, then those measures statistically compared to the measured baseline, and probability of improvement or worse performance calculated from the results. Depending on that comparison, the decision to deploy the new build or not can be determined.

CM Replacement: A CM of a certain type may have known CM responsiveness measures from historical information. Any single CM that performs over time statistically poorer than the population can be labeled as an outlier. These outliers, as they perform poorly, could be proactively removed from the network. Because statistical limits can be set with statistical certainty, the process can be automated so that any CM that performs below a statistical (or operational) target would trigger a new CM to be sent to the customer with a request to swap out the old CM for a new one, shipping the outlier back to the provider for testing and analysis, and perhaps scraping.

Optimal Polling Intervals for Specific Applications: Some applications may require a certain time and location density of data collection, especially when a CM is treated as an IoT device, such as with collecting power level data to monitor power grids, or other like use cases. As the frequency of data polling is increased, responsiveness may usually decrease. Using the responsiveness reliability and availability measures, applied at multiple polling frequencies, a table or curve of the measurements can be built at different polling frequencies to automatically determine the right polling frequencies for given device densities so that the monitoring can proceed using the measures, updating them over time, to adjust polling as needed to optimize monitoring resolution.

The ProOps platform 10 may optionally include other workers to facilitate certain metrics, such as to perform Spectrum Analysis; FEC Summary; Upstream Pre-Equalization; Histogram; RxMER; Constellation Display; Channel Estimation Coefficient;

Symbol Capture; Correlating Measurements, either across CMs or over time on a single CM; Optimal Maintenance Clustering; Redundant data collection; Workflow for locating an anomaly; Modem Reporting during failure; Crazy Ranging Correcting and/or Spectrum Analysis, as described in the above incorporated U.S. provisional patent application No. 62/698,382.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating proactive operations (ProOps) for a plurality of devices connected to a network, the method comprising:
processing raw data into a plurality of data layers, the raw data being obtained with a collection platform from a plurality of network connected devices, each of the plurality of data layers representing different results from processing of the raw data or data from another one of the data layers based on a data modeling;
orientating the raw data into orientated data, the raw data recoverable from the orientated data, and the orientated data being one of the plurality of layers; and
executing one or more actions as a function of information included in the plurality of data layers.

2. The method of claim 1 further comprising:
trigger analyzing the orientated data into actionable data, the actionable data being one of the plurality of data layers and compiling the orientated data relative to triggers associated with assessing the one or more actions.

3. The method of claim 2 further comprising:
sectioning the actionable data into decisional data, the decisional data being one of the plurality of data layers and quantifying the actionable data surpassing the triggers.

4. The method of claim 3 further comprising:
threshold analyzing the decisional data into work items, the work items being one of the plurality of data layers and executing the one or more actions.

5. The method of claim 4 further comprising implementing a resource monitor for enabling monitorial access to the raw data, the orientated data, the actionable data and the work items.

6. The method of claim 4 further comprising implementing a resource monitor for reconfiguring or adjusting processes for generating the raw data, the orientated data, the actionable data and the work items.

7. The method of claim 4 further comprising sorting the work items to estimate benefits of completing corresponding ones of the work items.

8. The method of claim 4 further comprising outputting identifiable data resulting from the work items to a dashboard application, the dashboard application providing a mechanism for interfacing the identifiable data with network administrators or systems employed by network administrators.

9. The method of claim 1, wherein the collection platform is a combined common collection framework (XCCF) platform that provides a structured approach to collecting the observational data from the plurality of devices.

10. The method of claim 1, wherein the network is part of a cable plant.

11. The method of claim 1 further comprising ranking the plurality of devices according to performance measure severity.

12. A non-transitory computer-readable medium having a plurality of instructions executable with a processor to facilitate a proactive operations (ProOps) platform, the plurality of instructions being for:
processing raw data into a plurality of data layers, the raw data being obtained with a collection platform from a plurality of network connected devices, each of the plurality of data layers representing different results from processing of the raw data or data from another one of the data layers based on a data modeling;
orientating the raw data into orientated data, the raw data recoverable from the orientated data, and the orientated data being one of the plurality of layers; and
executing one or more actions as a function of information included in the plurality of data layers.

13. The non-transitory computer-readable medium of claim 12, wherein the plurality of instructions is for implementing:
an extraction worker for orientating the raw data into orientated data; and a trigger analyzer worker for trigger analyzing the orientated data into actionable data, the actionable data being one of the plurality of data layers and compiling the orientated data relative to triggers associated with assessing the one or more actions.

14. The non-transitory computer-readable medium of claim 13, wherein the plurality of instructions is for implementing:
an actionable worker for sectioning the actionable data into decisional data, the decisional data being one of the plurality of data layers and quantifying the actionable data surpassing the triggers.

15. The non-transitory computer-readable medium of claim 14, wherein the plurality of instructions is for implementing:
a threshold analyzer worker for threshold analyzing the decisional data into work items, the work items being one of the plurality of data layers and executing the one or more actions.

16. The non-transitory computer-readable medium of claim 12, wherein the plurality of instructions is for implementing a resource monitor for enabling monitorial access to the raw data, the orientated data, the actionable data and the work items.

17. The non-transitory computer-readable medium of claim 12, wherein the plurality of instructions is for implementing a resource monitor for reconfiguring or adjusting processes for generating the raw data, the orientated data, the actionable data and the work items.

18. The non-transitory computer-readable medium of claim 12, wherein the collection platform is a combined common collection framework (XCCF) platform that provides a structured approach to collecting the observational data from the plurality of devices.

19. The non-transitory computer-readable medium of claim 12, wherein the network is part of a cable plant.

20. The non-transitory computer-readable medium of claim 12, wherein the plurality of instructions is for implementing searching the orientated data over frequency or time to indicate any detected anomaly.

* * * * *